(12) United States Patent
Kozel

(10) Patent No.: US 10,731,645 B1
(45) Date of Patent: Aug. 4, 2020

(54) STABILIZING BUSHING CONSTRUCTED OF FIBER REINFORCED STRUCTURAL COMPOSITE

(71) Applicant: John A. Kozel, Basking Ridge, NJ (US)

(72) Inventor: John A. Kozel, Basking Ridge, NJ (US)

( * ) Notice: Subject to any disclaimer, the term of this patent is extended or adjusted under 35 U.S.C. 154(b) by 0 days.

(21) Appl. No.: 16/257,337

(22) Filed: Jan. 25, 2019

(51) Int. Cl.
| | |
|---|---|
| F16J 15/44 | (2006.01) |
| F04C 15/00 | (2006.01) |
| C01B 32/20 | (2017.01) |
| C08J 5/04 | (2006.01) |
| F01C 21/02 | (2006.01) |
| F16J 15/40 | (2006.01) |

(52) U.S. Cl.
CPC .......... *F04C 15/0026* (2013.01); *C01B 32/20* (2017.08); *C08J 5/04* (2013.01); *C01B 2204/04* (2013.01); *F01C 21/02* (2013.01); *F16J 15/40* (2013.01); *F16J 15/441* (2013.01)

(58) Field of Classification Search
CPC ........ F04C 15/0026; C01B 32/20; C08J 5/04; F01C 21/02; F16J 15/40; F16J 15/441
See application file for complete search history.

(56) References Cited

U.S. PATENT DOCUMENTS

| | | | | |
|---|---|---|---|---|
| 4,305,592 | A | * 12/1981 | Peterson | B63H 23/321 |
| | | | | 277/430 |
| 5,840,399 | A | 11/1998 | Kozel | |
| 6,082,904 | A | * 7/2000 | Ono | F16C 9/00 |
| | | | | 384/291 |
| 2005/0141791 | A1 | 6/2005 | Roos et al. | |
| 2005/0213859 | A1 | 9/2005 | Kuroda et al. | |
| 2007/0114728 | A1* | 5/2007 | Schollhorn | F16J 15/442 |
| | | | | 277/411 |
| 2016/0169389 | A1* | 6/2016 | Haynes | F16J 15/442 |
| | | | | 277/544 |
| 2016/0327162 | A1* | 11/2016 | Liu | F16J 15/3252 |
| 2017/0211583 | A1 | 7/2017 | Kozel | |
| 2019/0010944 | A1* | 1/2019 | Jorwekar | F04C 18/0215 |

FOREIGN PATENT DOCUMENTS

JP 2008190674 A 8/2008

* cited by examiner

*Primary Examiner* — Gilbert Y Lee
(74) *Attorney, Agent, or Firm* — Arthur Jacob

(57) ABSTRACT

A stabilizing bushing is constructed of a structural composite including layers of reinforcing fibers in a matrix of synthetic polymeric material, and is inserted between a rotating shaft and a surrounding housing to stabilize the shaft against unwanted radial displacement while rotating within the housing. A plurality of circumferential grooves in the bushing effect a reduction in fluid pressure between one end of the bushing exposed to higher fluid pressures than to which the opposite end of the bushing is exposed. The bushing is constructed in the form of circumferential segments selectively joined together at Z-shaped joints for facilitating the insertion and establishment of a securely integrated stabilizing bushing in position around the shaft.

23 Claims, 5 Drawing Sheets

STABILIZING BUSHING CONSTRUCTED OF FIBER REINFORCED STRUCTURAL COMPOSITE

The present invention relates generally to stabilizing a rotating member during rotation within a surrounding structure and pertains, more specifically, to the construction of a stabilizing bushing inserted between a rotating member and a surrounding structure within which the member is rotating.

An important consideration in the design and construction of machinery in which a rotating element, such as a shaft, is stabilizing the rotating element against excessive radial movements and concomitant lateral displacement and vibration during rotation within a housing, resulting in excessive wear and the breakdown of any requisite bearings, wear rings, casing rings, and mechanical seals. The present invention addresses the problem of excessive radial movements and lateral displacement in rotating elements, such as shafts, within surrounding structures, by inserting a stabilizing bushing constructed of a structural composite of reinforcing fibers within a matrix of synthetic polymeric material, and configured for avoiding excessive radial movements and lateral displacement, with consequent deleterious effects.

As such, the present invention attains several objects and advantages some of which are summarized as follows: Precludes excessive radial movements, and consequent deflection and vibration, in rotating members during rotation within a surrounding structure; facilitates the insertion of a stabilizing bushing within existing machinery to militate against excessive radial movements and consequent deleterious vibration during operation of such machinery; enables a balancing of internal fluid pressures within fluid passages extending along a rotating member rotating within a surrounding structure; increases the service life of bearings and various contact points in machinery incorporating rotating elements; provides an economical, effective construction in a stabilizing bushing capable of exemplary performance in militating against deleterious conditions ordinarily associated with rotating component parts of machinery over an extended service life.

The above objects and advantages, as well as further objects and advantages, are attained by the present invention which may be described briefly as a stabilizing bushing for insertion between a rotating member and a surrounding structure to stabilize the rotating member against unwanted radial displacement while rotating within the surrounding structure, with one of axially opposite ends of the stabilizing bushing exposed to fluid pressure within the surrounding structure, the stabilizing bushing comprising: an annular body constructed of a structural composite including a plurality of layers of reinforcing fibers in a matrix of synthetic polymeric material, the layers extending transverse to an axial direction, essentially parallel to one another and juxtaposed with one another, stacked consecutively adjacent one another essentially along the axial direction, thereby establishing an entire stack of the plurality of adjacent layers, the reinforcing fibers of each layer being woven in a pattern oriented essentially perpendicular to the axial direction, and further reinforcing fibers extending through the juxtaposed layers, along further directions essentially parallel to the axial direction; an outer perimeter having an outer diameter dimensioned and configured for supporting the annular body within the surrounding structure; an inner perimeter having an inner diameter dimensioned and configured for supporting the rotating member for rotation within the stabilizing bushing; and a plurality of circumferential grooves spaced apart axially along the inner perimeter and extending radially outwardly into the annular body for effecting a reduction in fluid pressure between the exposed one of the opposite ends of the stabilizing bushing and the opposite one of the ends.

The invention will be understood more fully, while still further objects and advantages will become apparent, in the following detailed description of preferred embodiments of the invention illustrated in the accompanying drawing, in which.

Figure 1:
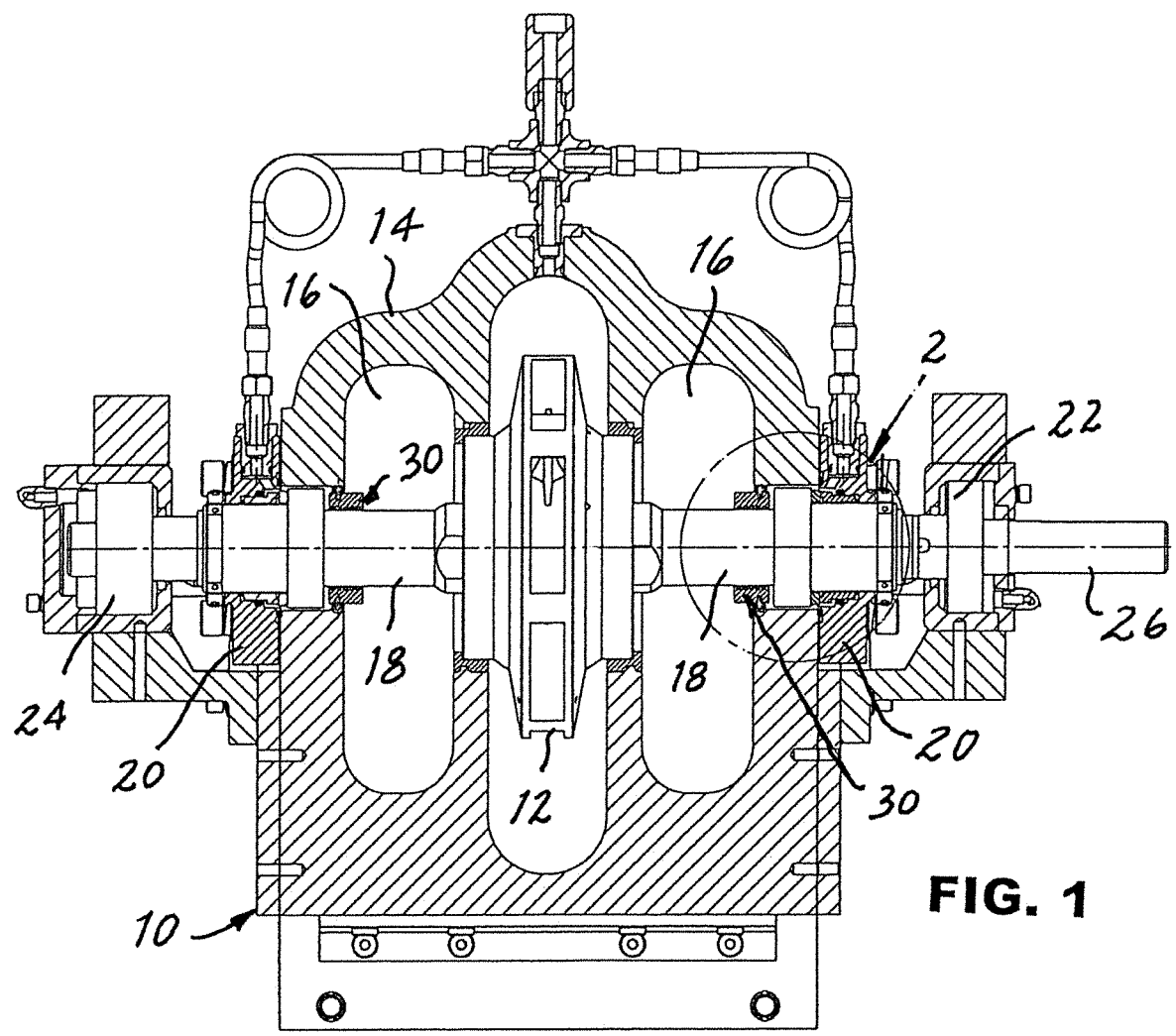
FIG. 1 is a cross-sectional view of a machine incorporating a stabilizing bushing constructed in accordance with the present invention.
Figure 2:
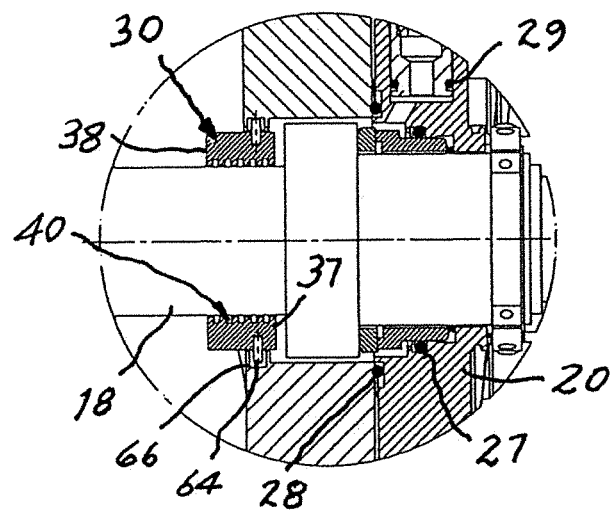
FIG. 2 is an enlarged fragmentary view of a portion of the machine identified by arrow 2 in FIG. 1.
Figure 3:
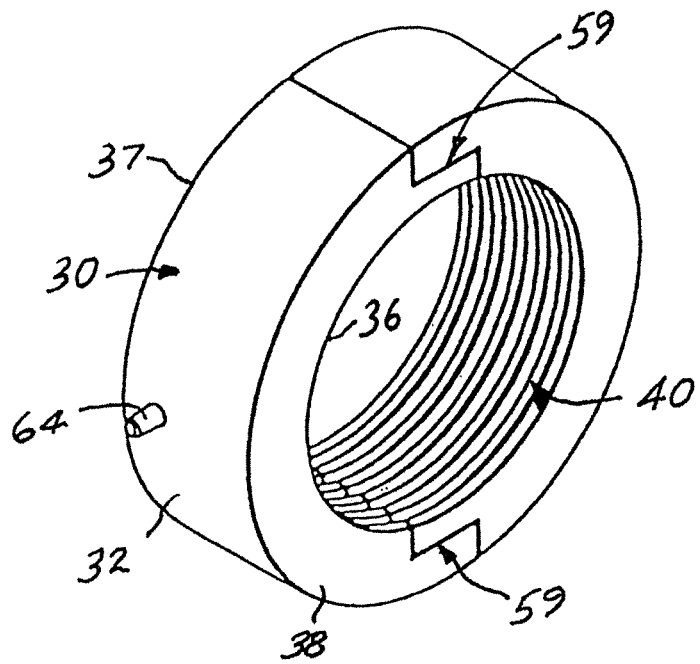
FIG. 3 is a pictorial view of the stabilizing bushing.
Figure 4:
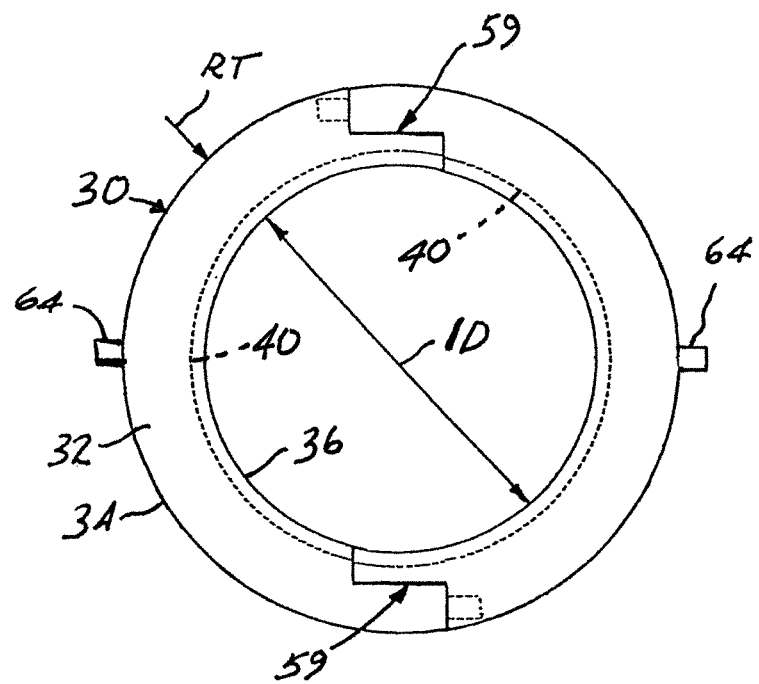
FIG. 4 is a plan view of the stabilizing bushing.
Figure 5:
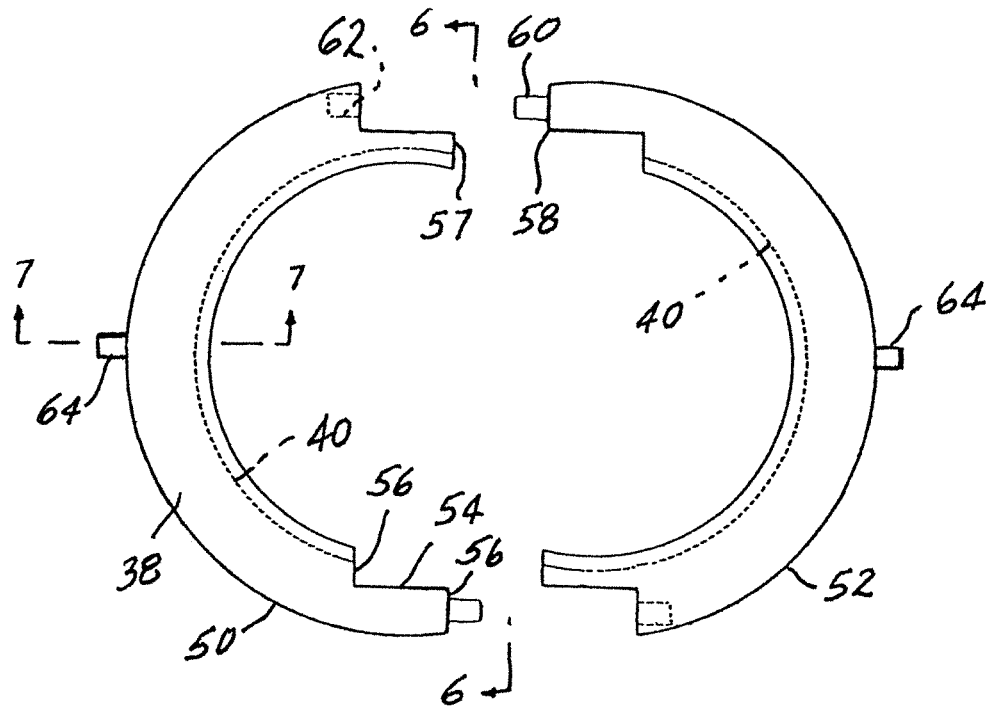
FIG. 5 is an exploded plan view of the stabilizing bushing.
Figure 6:
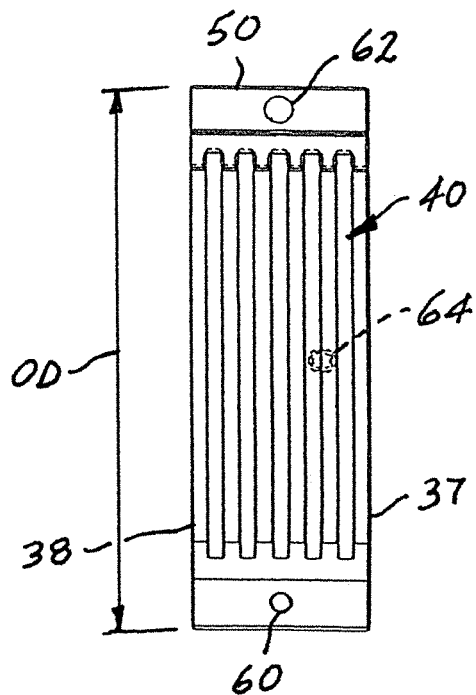
FIG. 6 is an elevational view taken along line 6-6 of FIG. 5.
Figure 7:
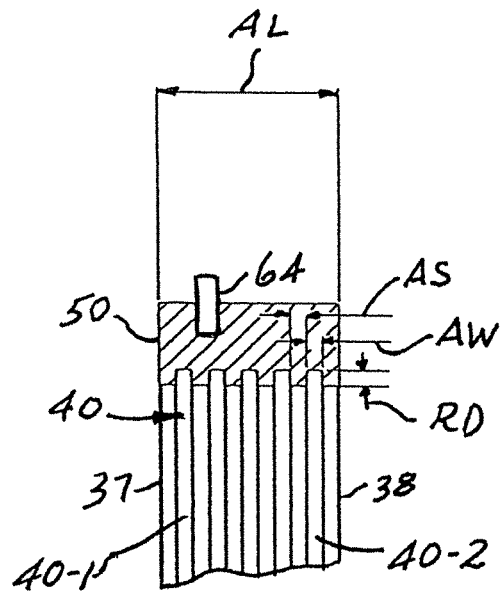
FIG. 7 is a fragmentary cross-sectional view taken along line 7-7 of FIG. 5.

Referring now to the drawing, and especially to FIGS. 1 and 2 thereof, a machine having rotating component parts is illustrated in the form of a pump 10 having an impeller 12 mounted for rotation within a stationary surrounding structure, shown in the form of a housing 14 which, in the illustrated embodiment, serves as a casing having intake chambers 16 communicating with the impeller 12. In a now conventional manner, impeller 12 is rotated by a rotating member shown in the form of a drive shaft 18 which extends axially into intake chamber 16, through stuffing boxes 20, and is supported for rotation within housing 14 by bearings 22 and 24. Drive shaft 18 extends beyond bearing 22 to be engaged at 26 by a drive motor (not shown) for operation of pump 10 in the conventional manner.

Stabilizing bushings constructed in accordance with the present invention are shown at 30 and are seen installed within pump 10 by having been inserted between drive shaft 18 and housing 14. The placement of stabilizing bushings 30 between drive shaft 18 and housing 14 stabilizes drive shaft 18 against excessive radial movements, such as by vibration or another lateral deflection relative to housing 14 during rotation of drive shaft 18. At the same time pressure differentials between each stuffing box 20 and a corresponding intake chamber 16 are reduced, thereby preserving sealing provided at seals 27, 28 and 29 within stuffing boxes 20.

Turning now to FIGS. 3 through 7, stabilizing bushing 30 is seen to include an annular body 32 having an outer perimeter 34 and an inner perimeter 36. Outer perimeter 34 is dimensioned and configured with an outer diameter OD for supporting annular body 32 within housing 14, and inner perimeter 36 has an inner diameter ID dimensioned and configured for supporting drive shaft 18 for rotation within stabilizing bushing 30, all as depicted in FIGS. 1 and 2. Annular body 32 has a given radial thickness RT between outer perimeter 34 and inner perimeter 36 and an axial length AL between opposite ends 37 and 38.

Annular body 32 includes a plurality of circumferential grooves 40 spaced apart axially along the inner perimeter 36, between opposite ends 37 and 38, and extending radially outwardly into the annular body 32. In the illustrated preferred embodiment, five grooves 40 having a radial depth RD and an axial width AW are spaced apart axially equally between opposite ends 37 and 38, by an axial spacing AS between adjacent grooves 40, with a first groove 40-1 juxtaposed with and spaced from one end 37 by a same axial spacing AS, and a second groove 40-2 juxtaposed with and spaced from opposite end 38 by a same axial spacing AS. Preferably, radial depth RD is approximately eighteen to twenty percent of the radial thickness RT. The series of grooves 40 effects a reduction in fluid pressure between the first end 37 of stabilizing bushing 30, which first end 37 is exposed to a higher fluid pressure present adjacent corresponding stuffing box 20, and the opposite second end 38. In this manner, pressure differentials between each stuffing box 20 and a corresponding intake chamber 16 are reduced, thereby preserving the sealing integrity provided by seals 27, 28 and 29 within stuffing boxes 20.

In order to facilitate insertion of stabilizing bushing 30 into housing 14, surrounding drive shaft 18, as seen in FIGS. 1 and 2, annular body 32 is comprised of at least two separate circumferential segments, shown in the form of arcuate segments 50 and 52, selectively joined together to establish the annular body 32. To this end, each arcuate segment 50 and 52 extends circumferentially along just over 180° and carries complementary joint elements, shown in the form of a circumferentially extending stem 54 and radially extending arms 56 of a letter "Z" at respective terminal ends 57 and 58 of the arcuate segments 50 and 52 so that upon joining the arcuate segments 50 and 52, corresponding joint stems 54 and arms 56 establish a Z-shaped joint 59, secured and reinforced by a circumferential pin 60 pressed into a complementary circumferential bore 62 to complete annular body 32 and fully assembled stabilizing bushing 30. A similar radial pin 64 is extended radially from assembled stabilizing bushing 30 into a complementary recess 66 in housing 14 to secure the assembled stabilizing bushing 30 around drive shaft 18, fixed in place within housing 14, as seen in FIGS. 1 and 2.

Figure 8:
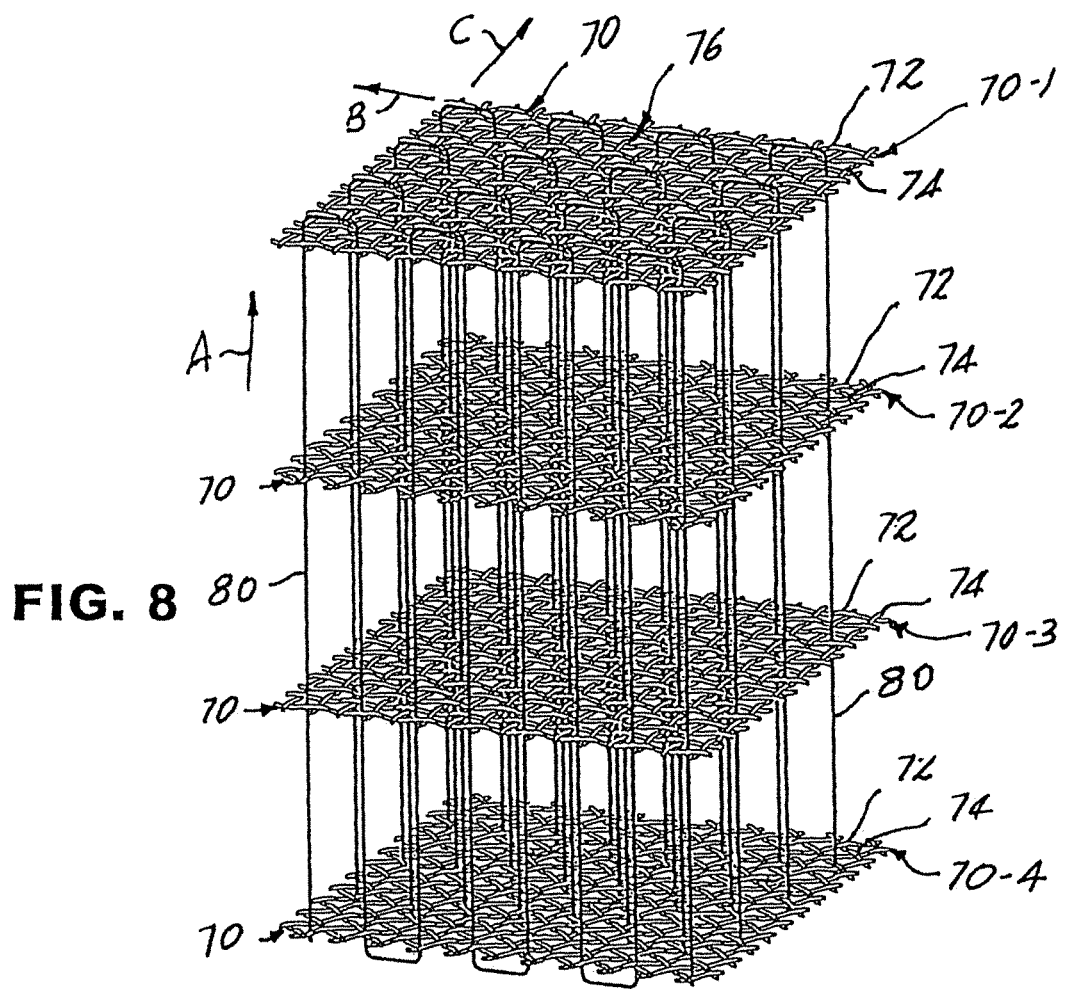
FIG. 8 is a diagrammatic pictorial illustration showing a step in the construction of the stabilizing bushing.
Figure 9:
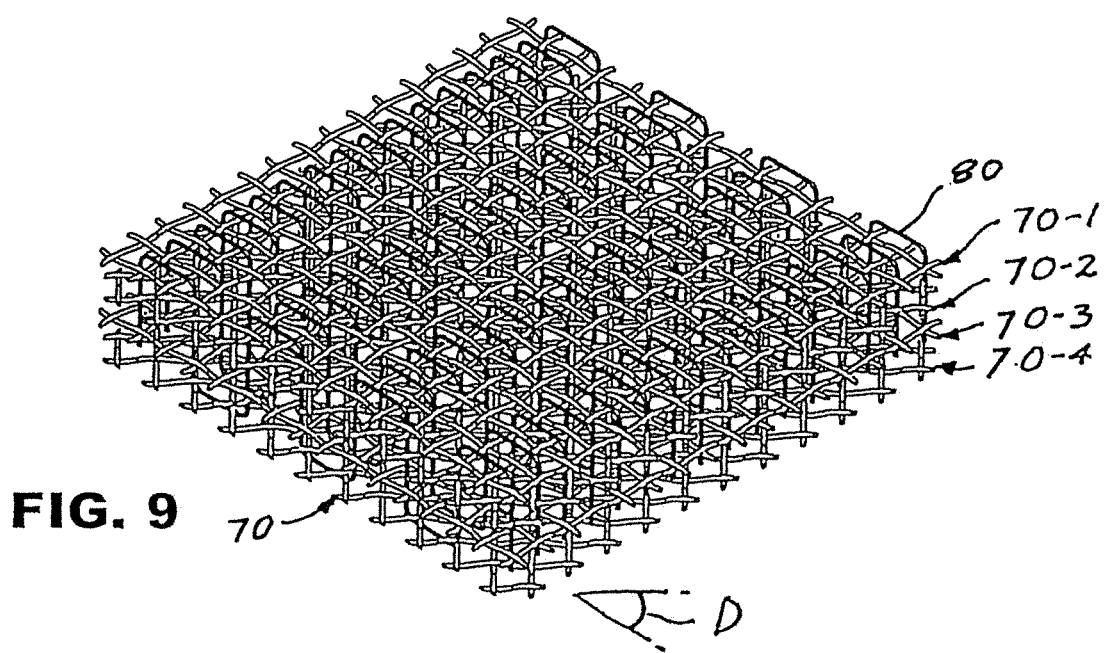
FIG. 9 is a diagrammatic pictorial illustration showing a further step in the construction of the stabilizing bushing.

Turning now FIGS. 8 through 11, stabilizing bushing 30 advantageously is constructed of a fiber reinforced structural composite, in accordance with the procedure set forth in detail in an earlier patent, U.S. Pat. No. 5,840,399, and in currently pending U.S. patent application Ser. No. 15/007,349, filed Jan. 27, 2016, the entire disclosures of which patent and patent application are incorporated herein by reference thereto. The current procedure is summarized as follows: As best seen in FIGS. 8 and 9, a plurality of layers 70 include reinforcing fibers 72 and 74 woven into a pattern 76, which pattern 76 preferably is in the form of an orthogonal pattern in which the reinforcing fibers 72 and 74 extend essentially perpendicular to one another, that is, fibers 72 are oriented at 90° relative to fibers 74. The reinforcing fibers 72 and 74 are embedded in a matrix 78 of synthetic polymeric material, in a manner described more fully in the aforesaid U.S. Pat. No. 5,840,399 and U.S. patent application Ser. No. 15/007,349.

The layers 70 are stacked along an axial direction A, with the reinforcing fibers 72 and 74 of each layer 70 extending in orthogonal directions B and C, transverse to axial direction A. Within the stacked layers 70, each layer 70 is rotated about the axial direction A with respect to a next consecutive adjacent layer 70, as illustrated in FIG. 8 where the reinforcing fibers 72 and 74 of layer 70-2 are rotated through an angular displacement D relative to the reinforcing fibers 72 and 74 of layer 70-1. Likewise, the next adjacent layer 70-3 is rotated through an angular displacement D relative to layer 70-2, and the layer 70-4, next adjacent to layer 70-3, is rotated through an angular displacement D relative to layer 70-3. In the preferred construction, the angular displacement D is about 45°.

Further reinforcing fibers 80 are extended through the juxtaposed, stacked layers 70, reinforcing fibers 80 preferably extending essentially parallel to the axial direction A. Once the stacking operation is completed, the layers 70 are stitched together with the reinforcing fibers 80 extending essentially in the axial direction A, as shown in FIG. 8. The stitching fibers 80 extend throughout the length and width of the stacked layers 70 and are interspersed among the reinforcing fibers 72 and 74 to provide reinforcement throughout a completed stack 90, shown in FIG. 9, essentially parallel to the height of the stack 90, in axial directions. In addition, the stitching provided by the fibers 80 secures together the layers 70 in the stack 90. In the preferred procedure, additional synthetic polymeric matrix material is injected into the stitched stack 90 to assure that reinforcing fibers 72 and 74, together with further reinforcing fibers 80, all are fully embedded within a surrounding matrix of synthetic polymeric matrix material.

Figure 10:
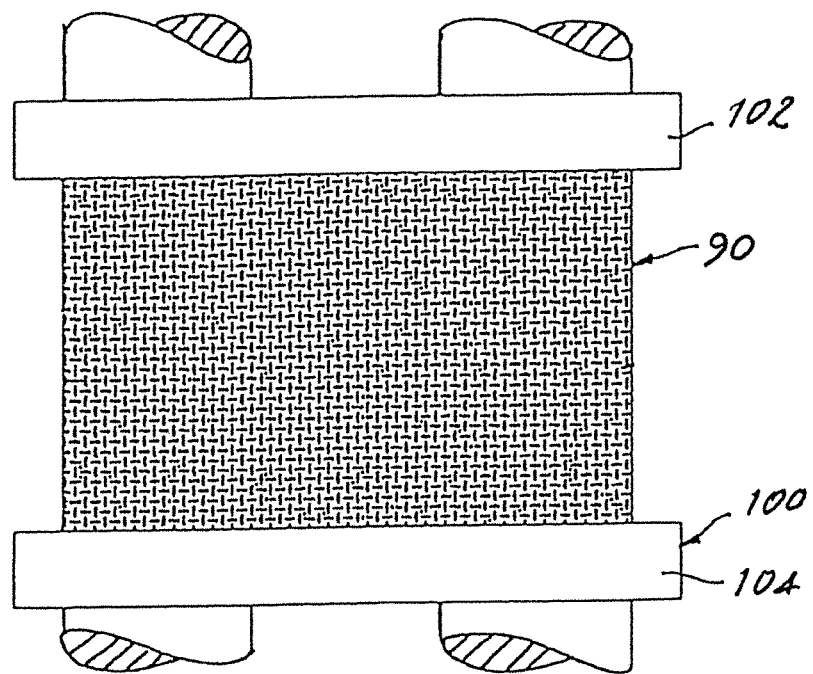
FIG. 10 is a diagrammatic pictorial illustration showing a still further step in the construction of the stabilizing bushing.
Figure 11:
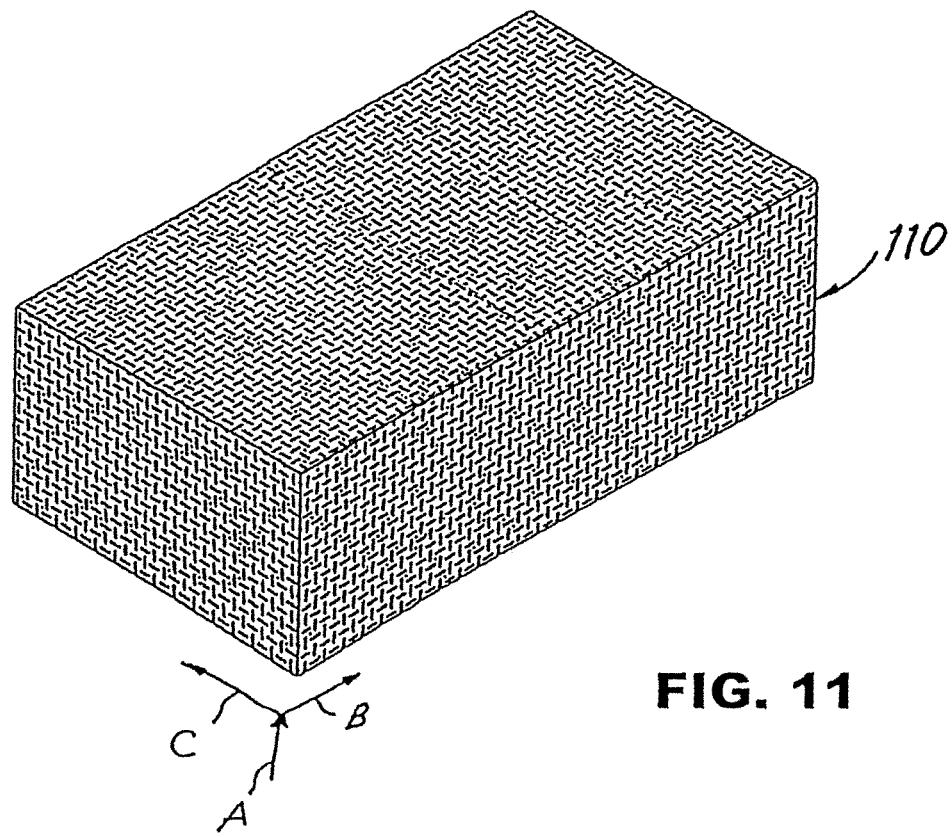
FIG. 11 is a pictorial depiction of an intermediate blank formed during construction of the stabilizing bushing.

The stack 90 then is placed in a press 100, as illustrated in FIG. 10, between platens 102 and 104, and is compressed and cured, at a preferred pressure of about 2,000 psi and a preferred temperature of about 600° F. The resulting block 110 of composite material, illustrated in FIG. 11, has a height along the axial direction A which is approximately one-half the height of the stack 90 when first introduced into press 100. Accordingly, the stack 90 is constructed with a height approximately twice that which is desired in the completed block 110. The curing time in the press 100 is about two hours per inch of the height of the completed block 110 along the axial direction A. For example, a block 110 having a length and width of four feet and a height of eight inches requires a stack 90 of sixteen inches and a curing time in press 100 of approximately sixteen hours. Typically, a block 110 with a length and width of four feet can have a height of from one inch to forty-eight inches; however, other dimensions are feasible.

The reinforcing fibers 72, 74 and 80 include a combination of graphite fibers, aramid fibers and soft glass fibers. In the preferred construction, the reinforcing fibers 72 and 74 are selected from the group consisting of graphite fibers, aramid fibers and soft glass fibers. The graphite fibers are non-conductive and preferably have a thickness of approximately 0.032 inch. The further reinforcing fibers 80 preferably are soft glass fibers. A preferred composition includes about twenty-five to thirty percent graphite fibers, about twenty-five to thirty percent aramid fibers, and about forty to fifty percent soft glass fibers. The synthetic polymeric matrix material is a hybrid resin system containing approximately equal percentages of epoxy thermoset resin and phenolic thermoset resin, preferably combined with approximately eight to ten percent by volume of a loose graphite powder additive. The preferred ratio of reinforcing fibers 72, 74 and 80 to resin matrix 78 is approximately sixty to sixty-five percent fibers to forty to thirty-five percent hybrid resin matrix.

The reinforcing fibers 72 and 74 of different layers 70 are of corresponding different materials, with the layers 70 being arranged in stack 90 such that the material of the reinforcing fibers 72 and 74 in each layer 70 is different from the material of the reinforcing fibers 72 and 74 of the next consecutive adjacent layer 70. Thus, with reference to FIGS. 8 and 9, the material of reinforcing fibers 72 and 74 in layer 70-2 is different from the material of reinforcing fibers 72 and 74 in layer 70-1, and the material of reinforcing fibers 72 and 74 in layer 70-3 is different from the material of reinforcing fibers 72 and 74 in layer 70-2, while the material of reinforcing fibers 72 and 74 in layer 70-4 is different from the material of reinforcing fibers 72 and 74 in layer 70-3. In this manner, the combination of reinforcing fibers and resin matrix provides structural composite block 110 with a semi-isotropic construction in which the mechanical properties of the composite structure are within 100 psi tensile strength in the B and C directions, thereby maintaining maximum physical properties in all products manufactured from a composite block 110, as described above.

It will be apparent that the present invention attains the objects and advantages summarized above, namely: Precludes excessive radial movements, and consequent deflection and vibration, in rotating members during rotation within a surrounding structure; facilitates the insertion of a stabilizing bushing within existing machinery to militate against excessive radial movements and consequent deleterious vibration during operation of such machinery; enables a balancing of internal fluid pressures within fluid passages extending along a rotating member rotating within a surrounding structure; increases the service life of bearings and various contact points in machinery incorporating rotating elements; provides an economical, effective construction in a stabilizing bushing capable of exemplary performance in militating against deleterious conditions ordinarily associated with rotating component parts of machinery over an extended service life.

it is to be understood that the above detailed description of preferred embodiments of the invention are provided by way of example only. Various details of design, construction and procedure may be modified without departing from the true spirit and scope of the invention, as set forth in the appended claims.

The embodiments of the invention in which an exclusive property or privilege is claimed are defined as follows:

1. A stabilizing bushing for insertion between a rotating member and a surrounding structure to stabilize the rotating member against unwanted radial displacement while rotating within the surrounding structure, with one of axially opposite ends of the stabilizing bushing exposed to fluid pressure within the surrounding structure, the stabilizing bushing comprising:
    an annular body constructed of a structural composite including a plurality of layers of reinforcing fibers in a matrix of synthetic polymeric material, the layers extending transverse to an axial direction, essentially parallel to one another and juxtaposed with one another, stacked consecutively adjacent one another essentially along the axial direction, thereby establishing an entire stack of the plurality of adjacent layers, the reinforcing fibers of each layer being woven in a pattern oriented essentially perpendicular to the axial direction, and further reinforcing fibers extending through the juxtaposed layers, along further directions essentially parallel to the axial direction;
    an outer perimeter having an outer diameter dimensioned and configured for supporting the annular body within the surrounding structure;
    an inner perimeter having an inner diameter dimensioned and configured for supporting the rotating member for rotation within the stabilizing bushing in contact with the inner perimeter along the stabilizing bushing essentially from one to the other of the opposite ends of the stabilizing bushing; and
    a plurality of individual circumferential grooves separate from one-another and spaced apart axially at and along the inner perimeter, the grooves and extending radially outwardly into the annular body for effecting a reduction in fluid pressure between the exposed one of the opposite ends of the stabilizing bushing and the opposite one of the ends.

2. The stabilizing bushing of claim 1 wherein the circumferential grooves are spaced apart axially from a first groove juxtaposed with the exposed end to a last groove juxtaposed with the opposite one of the ends.

3. The stabilizing bushing of claim 1 wherein the annular body has a given radial thickness between the outer perimeter and the inner perimeter, and each groove extends radially outwardly into the annular body over a radial depth of approximately eighteen to twenty percent of the radial thickness.

4. The stabilizing bushing of claim 3 wherein the circumferential grooves each include an axial width approximately equal to the radial depth and are spaced apart axially from a first groove juxtaposed with the exposed end to a last groove juxtaposed with the opposite one of the ends.

5. The stabilizing bushing of claim 1 wherein the structural composite reinforcing fibers comprise approximately fifty-five to sixty percent of the structural composite.

6. The stabilizing bushing of claim 1 wherein the reinforcing fibers of different layers are of corresponding different materials, the layers being arranged such that the material of the reinforcing fibers in each layer is different from the material of the reinforcing fibers in the next consecutive adjacent layer throughout the entire stack of the plurality of adjacent layers.

7. The stabilizing bushing of claim 6 wherein the structural composite reinforcing fibers comprise approximately fifty-five to sixty percent of the structural composite.

8. The stabilizing bushing of claim 1 including loose graphite additive distributed throughout the matrix of synthetic polymeric material.

9. The stabilizing bushing of claim 8 wherein the loose graphite additive comprises at least approximately eight to ten percent of the structural composite.

10. The stabilizing bushing of claim 8 wherein the reinforcing fibers of different layers are of corresponding different materials, the layers being arranged such that the material of the reinforcing fibers in each layer is different from the material of the reinforcing fibers in the next consecutive adjacent layer throughout the entire stack of the plurality of adjacent layers.

11. The stabilizing bushing of claim 10 wherein the loose graphite additive comprises at least approximately eight to ten percent of the structural composite.

12. The stabilizing bushing of claim 11 wherein the structural composite reinforcing fibers comprise approximately fifty-five to sixty percent of the structural composite.

13. The stabilizing bushing of claim 1 wherein the annular body comprises at least two separate circumferential segments having respective terminal ends selectively joined together to establish the annular body.

14. The stabilizing bushing of claim 13 wherein each of the respective terminal ends includes a circumferentially extending stem and radially extending arms such that the joined together terminal ends establish a Z-shaped joint securing together the circumferential segments.

15. The stabilizing bushing of claim 13 wherein the structural composite reinforcing fibers comprise approximately fifty-five to sixty percent of the structural composite.

16. The stabilizing bushing of claim 13 including loose graphite additive distributed throughout the matrix of synthetic polymeric material.

17. The stabilizing bushing of claim 16 wherein the loose graphite additive comprises at least approximately eight to ten percent of the structural composite.

18. The stabilizing bushing of claim 17 wherein each of the respective terminal ends includes a circumferentially extending stem and radially extending arms such that the joined together terminal ends establish a Z-shaped joint securing together the circumferential segments.

19. The stabilizing bushing of claim 13 wherein the reinforcing fibers of different layers are of corresponding different materials, the layers being arranged such that the material of the reinforcing fibers in each layer is different from the material of the reinforcing fibers in the next consecutive adjacent layer throughout the entire stack of the plurality of adjacent layers.

20. The stabilizing bushing of claim 19 wherein the structural composite reinforcing fibers comprise approximately fifty-five to sixty percent of the structural composite.

21. The stabilizing bushing of claim 19 including loose graphite additive distributed throughout the matrix of synthetic polymeric material.

22. The stabilizing bushing of claim 21 wherein the loose graphite additive comprises at least approximately eight to ten percent of the structural composite.

23. The stabilizing bushing of claim 22 wherein each of the respective terminal ends includes a circumferentially extending stem and radially extending arms such that the joined together terminal ends establish a Z-shaped joint securing together the circumferential segments.

* * * * *